Patented Apr. 2, 1940

2,195,712

UNITED STATES PATENT OFFICE 2,195,712

HALOGENATION OF UNSATURATED CARBOXYLIC ACID ESTERS

Ralph A. Jacobson, Wilmington, Del., assignor to E. I. du Pont de Nemours & Company, Wilmington, Del., a corporation of Delaware No Drawing. Application October 29, 1935, Serial No. 47,225

5 Claims. (Cl. 260—485)

This invention relates to new compositions of matter and to processes for their preparation and more particularly, it relates to certain halogenated aliphatic dicarboxylic acids and their esters.

An object of the invention is the preparation of new and useful chemical compounds. A further object is the preparation of a new class of halogenated aliphatic dicarboxylic acids and their esters. A still further object of the invention is to provide a process for the halogenation of aliphatic monocarboxylic acids and esters, containing the group

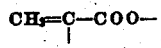

and subsequent saponification of the high boiling halogenated product obtained. Other objects and advantages of the invention will hereinafter appear.

These objects are accomplished by halogenating, in the presence of small quantities of suitable halogenation catalysts, and at about 0° C., monomeric esters of monocarboxylic aliphatic acids containing the group

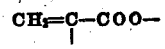

isolating the high-boiling halogenated fraction, composed of esters of certain halogenated aliphatic dicarboxylic acids, and if desired, hydrolyzing this fraction to the free dihalogen dicarboxylic acids corresponding to such esters.

According to this invention, chlorine is passed into a monomeric ester of an aliphatic monocarboxylic acid containing the group.

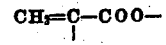

at 0° C. until an increase in weight is obtained corresponding to the addition of the desired quantity of chlorine. A small quantity of bromine may be added to the reaction mixture as a chlorination catalyst. The reaction mixture is then distilled to remove low boiling fractions, which consist of monomeric esters of di-chloromonocarboxylic acids. The high-boiling fraction is then distilled under reduced pressure. The products are thick oily liquids consisting of esters of chlorinated aliphatic dicarboxylic acids.

The thick oily product obtained from methyl methacrylate in accordance with the process of this invention has not been fully identified, although experimental evidence indicates that it is a dicarboxylic acid ester and specifically a glutaric acid derivative having the formula indicated below.

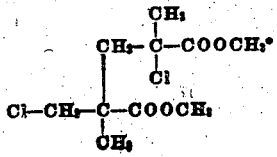

In the above formula subsequent chlorination of one of the methyl or methylene groups would account for a third or fourth chlorine atom which may be present. Upon saponification of the ester with aqueous alkali a dichloro-dibasic acid is obtained as in Example 2 (below). Since by saponification with aqueous alkali, a dichloroaliphatic dicarboxylic acid is obtained, it is believed that the third chlorine in the ester is attached to one of the methyl groups marked with an asterisk and is thus removed upon saponification.

Examples will now be given to illustrate fully the halogenation and subsequent saponification steps, but it will be understood that the invention will not be limited to the details therein given.

EXAMPLE 1.—*Chlorination of methyl methacrylate*

To a solution of 800 g. of methyl methacrylate (8 mols) in 800 cc. of carbon tetrachloride was added 3 cc. of bromine and the solution cooled to 0° C. Chlorine was passed into the solution at this temperature for eight hours. The increase in weight amounted to 435 g. Removal of the carbon tetrachloride and distillation of the product yielded two main fractions. The first (450 g.) had the correct boiling point for alpha, beta-dichloromethyl isobutyrate; the second fraction (453 g.) which was a thick oily liquid with a faint but not unpleasant odor, distilled over almost completely at 138° C. under 2 mm. pressure. Analytically the material corresponded to a trichloro-dimer of methyl methacrylate. It is quite stable, since no resin formed during the distillation. Analysis gave the following results:

| | Found | Calculated for trichlor-dimer |
|---|---|---|
| C | 37.72% | 39.4% |
| H | 4.81 | 4.92 |
| Cl | 36.60 | 35.00 |
| Mol. wt | 292 | 305.5 |
| $D_4^{20}$ | 1.3176 | |
| $N_D^{20}$ | 1.4691 | |

EXAMPLE 2.—*Saponification of the trichlorodimer of methyl methacrylate*

Forty-five and seventy-five hundredths grams of the high-boiling product obtained from the chlorination of methyl methacrylate according to Example 1 was refluxed for several hours with a solution of 30 g. of sodium hydroxide in 150 cc. of water. The oily ester dissolved during this procedure. The solution was filtered, and upon acidification with hydrochloric acid and cooling to about 20° C., a voluminous white crystalline precipitate separated. Crystallization from water yielded beautiful long needles melting at 57–58°

C. The compound dissolved in alkali, being reprecipitated by hydrochloric acid. Its neutral equivalent was one-half of the determined molecular weight showing that the acid was dibasic. Analysis of this acid gave the following results:

|  | Found | Calculated for trichlor-dimer |
|---|---|---|
| C | 39.12 | 39.50 |
| H | 4.34 | 4.93 |
| Cl | 29.43 | 29.21 |
| Neutral equivalent | 121 | 121.5 |
| Molecular wt. from neutral equivalent | 242 | 243 |
| Molecular wt. by freezing pt. method | 232 | |

The probable formula for the acid is:

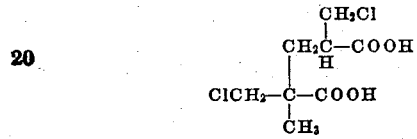

EXAMPLE 3.—*Chlorination of propyl methacrylate*

Chlorine was slowly passed into 356 g. (2.78 mols) of propyl methacrylate containing 2 cc. of bromine and cooled to —10° C., until an increase in weight amounting to 191 g. was obtained. Distillation of the reaction mixture yielded two main fractions: (a) Two-hundred fourteen grams of a product boiling at 80–81° C. under 1.5 mm. pressure and (b) two-hundred thirty-nine grams of a product boiling at 150–154° C. under 2 mm. pressure. Analysis of the high-boiling product gave the following results:

|  | Found | Calculated for $C_{14}H_{24}O_4Cl_2$ |
|---|---|---|
| Cl | 33.80 | 35.62 |
| Mol. wt | 316 | 327 |

EXAMPLE 4.—*Saponification of the high boiling product of Example 3*

Fifty-four and one-tenth grams of the high boiling product prepared as indicated in Example 3 was refluxed gently for seven hours with a solution of 45 g. of sodium hydroxide in 225 cc. of water. During this time most of the oil went into solution. Upon acidification with hydrochloric acid and cooling the reaction mixture to about 20° C., crystals separated from the solution. Crystallization from water yielded needle-shaped crystals melting at 57–58° C. (The melting point of this acid was identical with that obtained as indicated in Example 2. The neutral equivalents and chlorine content of the two acids were also identical.)

EXAMPLE 5.—*Chlorination of cyclohexyl methacrylate*

Chlorine was slowly passed into 336 g. (2 mols) of cyclohexyl methacrylate, containing 2 cc. of bromine and cooled to —10° C., until the increase in weight amounted to 142 g. The product was distilled in vacuo and two main fractions were collected, boiling respectively at 109–115° at 2 mm. and 162–187° at 2 mm. pressure. The ratio of low-boiling to high-boiling product was 1.5:1.

EXAMPLE 6.—*Chlorination of methyl acrylate*

Chlorine was passed into 172 g. (2 mols) of methyl acrylate containing 1 cc. of bromine, the reaction mixture being maintained at 0° C., until the increase in weight amounted to 131 g. Distillation of the product yielded two main fractions in about equal amounts, boiling respectively at 71–72° C. at 21 mm. and at 152–153° C. under 6 mm. pressure. Analyses indicated that the lower-boiling product was dichloro-methyl propionate and that the higher-boiling product was a tetrachloro-dimer of methyl acrylate. This product contained 45.55% of chlorine and was found to have a molecular weight of 312. The theoretical chlorine content for the tetrachloro-dimer is 45.5% and the molecular weight is 312.

While the process of this invention as applied to methyl methacrylate, propyl methacrylate, cyclohexyl methacrylate, and methyl acrylate is described in the preceding examples in general the process may be utilized for the production of halogenated aliphatic dicarboxylic acids and their esters from compounds of the general formula

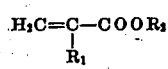

where $R_1$ and $R_2$ may be the same or different and are hydrogen or monovalent hydrocarbon radicals such as methyl, ethyl, dodecyl, cyclohexyl, phenyl, naphthyl, etc.

Halogens other than chlorine may be used but chlorine is preferred because of its cheapness and availability. Other chlorination catalysts may be used in place of bromine, for example, sulfur, iodine, ferric chloride, stannic chloride and other metal halides.

As indicated in the examples, the reactions may be carried out either in the presence or absence of solvents. For example, any inert aliphatic solvent can be used in the place of carbon tetrachloride (the use of which is illustrated in one of the examples) such as ethylene dichloride, solvent naphtha, etc. Aromatic hydrocarbon solvents would tend to halogenate during the reaction, thus introducing undesirable complications.

The reaction should be carried out at relatively low temperatures, but temperatures somewhat higher than those used in the examples might be used if the reaction is carried out in the presence of a suitable polymerization inhibitor such as hydroquinone.

The trichloro-dicarboxylic acid ester of Example 1 can be readily converted into a halogen-free diethoxy dicarboxylic acid by reacting it with an alcoholic solution of sodium ethylate at a refluxing temperature and acidifying. Analysis indicated that the reaction product purified by crystallization from water is a diethoxy dicarboxylic acid having the following formula:

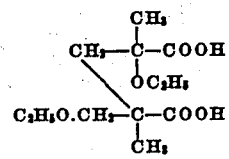

Many new derivatives of halogenated dibasic acids and esters may be made by reacting therewith alkali metal alcoholates, alkali metal salts of acids, etc., and subsequently purifying the products.

The products of this invention are useful for many purposes such as plasticizers for cellulose derivatives, e. g., nitrocellulose, cellulose acetate, methyl cellulose, etc. They are also useful in the preparation of polyhydric alcohol-polycarboxylic acid resins, etc. The low-boiling halogenated byproducts of this invention may also be utilized as solvents, insecticides, and lachrymators.

From a consideration of the above specification, it will be realized that many changes may be made in the processes described without departing from the invention or sacrificing any of its advantages.

I claim:

1. A process which comprises passing chlorine into a solution containing methyl methacrylate, carbon tetrachloride and bromine at a temperature of approximately 0° C., when the methyl methacrylate has absorbed approximately 55% of its weight of chlorine the carbon tetrachloride is removed and the product fractionated into two main fractions, one fraction containing the low boiling products, the other the high boiling products, refluxing the resulting high boiling products with sodium hydroxide filtering the product, and subsequently separating by acidification and cooling the voluminous white precipitate.

2. A saponified higher boiling fraction obtained by halogenating, at a temperature of approximately 0° C., a monomeric compound containing the group in which $R_1$ is a radical of the group consisting of hydrogen, methyl, ethyl and cyclohexyl, and $R_2$ is a radical of the group consisting of methyl, ethyl, cyclohexyl, phenyl and naphthyl.

3. A saponified higher boiling fraction of a halogenated monomeric methyl methacrylate which prior to saponification analytically corresponds to a trichloro-dimer of methyl methacrylate.

4. The acidified saponification product, of an oily liquid which analytically corresponds to a trichloro-dimer of methyl methacrylate, which crystallizes from water giving long needles, the crystals having a melting point at from approximately 57 to 58° C. and having the formula $C_8H_{12}O_4Cl_2$.

5. A process which comprises halogenating, at a temperature of approximately 0° C., a monomeric polymerizable compound containing the group

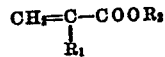

in which $R_1$ is a radical of the group consisting of hydrogen, methyl, ethyl, and cyclohexyl and $R_2$ is a radical of the group consisting of hydrogen, methyl, ethyl, cyclohexyl, phenyl and naphthyl in the presence of a halogenation catalyst and an inert solvent, and subsequently separating by fractional distillation the high boiling halogenated fraction from the low boiling halogenated fraction and finally saponifying the high boiling halogenated fraction.

RALPH A. JACOBSON.

CERTIFICATE OF CORRECTION.

Patent No. 2,195,712.                                April 2, 1940.

RALPH A. JACOBSON.

It is hereby certified that error appears in the printed specification of the above numbered patent requiring correction as follows: Page 3, first column, line 25, claim 2, after the word "group" first occurrence, insert the following formula -

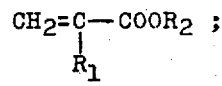

line 28, same claim, after "of" insert --hydrogen--; and that the said Letters Patent should be read with this correction therein that the same may conform to the record of the case in the Patent Office.

Signed and sealed this 7th day of May, A. D. 1940.

(Seal)

Henry Van Arsdale,
Acting Commissioner of Patents.